United States Patent
Yamamoto et al.

[11] Patent Number: 5,682,555
[45] Date of Patent: Oct. 28, 1997

[54] BUS CONTROL APPARATUS

[76] Inventors: Yasuyuki Yamamoto; Toshiya Ishibashi, both of Sony Corporation 7-35 Kitashinagawa 6-chome, Shinagawa-Ku, Tokyo, Japan

[21] Appl. No.: 556,803

[22] Filed: Nov. 2, 1995

Related U.S. Application Data

[62] Division of Ser. No. 241,339, May 11, 1994, abandoned.

[30] Foreign Application Priority Data

May 14, 1993 [JP] Japan ............ 5-112841

[51] Int. Cl.[6] ................................. G06F 13/00
[52] U.S. Cl. ................................ 395/886; 395/307
[58] Field of Search ................... 395/307, 308, 395/309, 882, 886

[56] References Cited

U.S. PATENT DOCUMENTS

| | | |
|---|---|---|
| 4,761,729 | 8/1988 | Brim ............ 395/325 |
| 4,860,198 | 8/1989 | Takenaka . |
| 4,947,368 | 8/1990 | Donaldson et al. . |
| 5,113,369 | 5/1992 | Kinoshita ............ 395/325 |
| 5,193,193 | 3/1993 | Iyer . |
| 5,241,632 | 8/1993 | O'Connell et al. . |
| 5,394,528 | 2/1995 | Kobayashi et al. ............ 395/325 |
| 5,416,907 | 5/1995 | Polzin et al. ............ 395/275 |
| 5,594,923 | 1/1997 | Inoue et al. ............ 395/886 |

FOREIGN PATENT DOCUMENTS

| | | |
|---|---|---|
| 0 339 224 | 11/1989 | European Pat. Off. . |
| 0 479 428 | 4/1992 | European Pat. Off. . |

Primary Examiner—Jack B. Harvey
Assistant Examiner—David A. Wiley

[57] ABSTRACT

A bus control apparatus is provided which can control the access timing between a central processing unit and a peripheral equipment without increasing the size and the cost of the entire system. The access timing between the central processing unit and the peripheral equipment is controlled in accordance with an operation timing of the peripheral equipment described in a timing table.

10 Claims, 13 Drawing Sheets

FIG. 3

(UNIT: CLOCK)

|  | DEVICE 7 | DEVICE 8 | ROM 5 | MEMORY 6 |
|---|---|---|---|---|
| READ DELAY TIME | 2 | 3 | 2 | 4 |
| WRITE DELAY TIME | 1 | 3 | — | 4 |
| HOLD TIME | 1 | 1 | 0 | 0 |
| FLOATING TIME | 2 | 0 | 0 | 0 |
| RECOVERY TIME | 0 | 0 | 0 | 10 |

TIMING TABLE

FIG. 4

|  | DEVICE 7 | DEVICE 8 | ROM 5 | MEMORY 6 |
|---|---|---|---|---|
| BUS WIDTH | 8 BIT | 16 BIT | 8 BIT | 16 BIT |
| ADDRESSING TYPE | FIXED | FIXED | VARIABLE | VARIABLE |

BUS WIDTH TABLE

BUS CONTROL APPARATUS

This application is a division of application Ser. No. 08/241,339, filed May 11, 1994, now abandoned.

BACKGROUND OF THE INVENTION

1. Field of the Invention

This invention relates to a bus control apparatus suitable for use with, for example, a computer.

2. Description of the Related Art

In a conventional computer, where a peripheral equipment such as, for example, an interface board which operates at a lower speed than the bus accessing speed of a CPU (central processing unit) of the computer is employed, if the bus accessing timing of the CPU is decreased in accordance with the bus accessing timing of the peripheral equipment, then the processing speed of the entire apparatus is reduced. Therefore, a so-called wait controller or a like apparatus is provided in order to adjust the timing at which a read signal or a write signal developed from the CPU is to be supplied to the peripheral equipment.

Further, in a conventional computer, where a peripheral equipment having a bus width different from that of the CPU is employed, in particular, where, for example, a peripheral equipment having a bus width of 8 bits is employed for a CPU of a bus width that has 32 bits, a hardware apparatus for exclusive use for packing and unpacking data is provided and data of 32 bits outputted from the CPU are divided (unpacked) into four groups of data of 8 bits to be supplied to the peripheral equipment whereas data of 8 bits outputted from the peripheral equipment are read four times to produce (pack) data of 32 bits to be supplied to the CPU.

By the way, such a wait controller as described above must be designed for each of the peripheral equipments to be connected to a computer. Accordingly, there is an issue with connectivity, but involves a high cost to resolve it.

Further, some peripheral equipments continue to output data even after the CPU has finished reading the data from the peripheral equipment, that is, have a long floating time. Further, some other peripheral equipments are required to hold data on a data bus for a while even after outputting of a data write the signal from the CPU to write data into the peripheral apparatus comes to an end, that is, have a long hold time.

For such peripheral equipments that have a long floating time or a long hold time, adjusting the operation timing of the peripheral equipment by means of a wait controller as described above is not enough, a special hardware contrivance is required.

Consequently, there is another problem to be solved that will increase the size and the cost of the apparatus.

Further, the hardware apparatus for packing and unpacking data as described above requires, similarly to a wait controller, individual designing, for example, packing-unpacking trigger generation logic in accordance with a peripheral equipment to be connected to the computer which will further increase the cost of the apparatus.

Furthermore, where a peripheral equipment having a bus width of 8 bits is employed for a CPU that has a bus width of 32 bits as described above, when four data of 8 bits obtained by unpacking a data of 32 bits outputted from the CPU are to be written into the peripheral equipment, for example, a memory, the address into which data should be written must be incremented by one four times. But if the peripheral equipment is a FIFO (first-in first-out) buffer for which reading and writing of data are performed at a fixed address, the peripheral equipment must be constructed so that the four data of 8 bits are written into the same fixed address.

Here in the present specification, a peripheral equipment is referred to as addressing type if its bus width is different from that of a CPU and the address is incremented or fixed as described above.

The hardware apparatus described above, however, is not constructed such that the address of a peripheral equipment into or from which data are to be written or read out is designated taking the addressing type of the peripheral equipment into consideration.

Accordingly, for example, an application program must be designed and programmed taking the addressing type of the peripheral equipment into consideration, which is cumbersome.

SUMMARY OF THE INVENTION

It is an object of the present invention to provide a bus control apparatus which can control communications of data between a CPU and a peripheral equipment without increasing the size and the cost of the entire system.

In order to attain the object described above, according to an aspect of the present invention, there is provided a bus control apparatus for interconnecting a plurality of bus lines, which comprises a main bus to which a central processing unit is connected, a sub bus to which a peripheral equipment is connected, storage means for storing an operation timing of the peripheral equipment, and control means for controlling an access timing between the central processing unit and the peripheral equipment in accordance with the operation timing of the peripheral equipment stored in the storage means.

In the bus control apparatus, the access timing between the central processing unit and the peripheral equipment is controlled by the control means in accordance with the operation timing of the peripheral equipment stored in the storage means. Accordingly, a special hardware apparatus such as, for example, a wait controller for adjusting the accessing timing between the central processing unit and the peripheral equipment need not be provided for each of peripheral equipments which may be connected to the main bus or the sub bus. Consequently, the access timing between the central processing unit and the peripheral equipment can be controlled without increasing the size and the cost of the entire system.

Preferably, the operation timing of the peripheral equipment stored in the storage means is re-writable so that, even if the specifications of the peripheral equipment are modified or a new peripheral equipment is added, such a situation does not make it impossible to use the apparatus.

The storage means may store at least a hold time or a recovery time of the peripheral equipment. In this instance, the timing can be controlled in accordance with the hold time or the recovery time.

Preferably, the main bus has a bus width greater than the bus width of the sub bus, and more preferably, the bus width of the main bus is equal to an integral number of times the bus width of the sub bus.

According to another aspect of the present invention, there is provided a bus control apparatus for interconnecting a plurality of bus lines, which comprises a main bus to which a central processing unit is connected, a sub bus to which a peripheral equipment is connected, storage means for storing a bus width and an addressing type of the peripheral equipment, data latch means for latching data outputted from the central processing unit or the peripheral equipment, address latch means for latching an address outputted from the central processing unit to the peripheral equipment; and control means for controlling packing/unpacking of data latched in the data latch means in accordance with the bus width of the peripheral equipment stored in the storage means and controlling the address latched in the address latch means in accordance with the addressing type of the peripheral equipment stored in the storage means.

In the bus control apparatus, data outputted from the central processing unit or the peripheral equipment are latched by the data latch means, and an address outputted from the central processing unit to the peripheral equipment is latched by the address latch means. Packing/unpacking of the data latched in the data latch means is controlled in accordance with the bus width of the peripheral equipment stored in the storage means while the address latched in the address latch means is controlled in accordance with the addressing type of the peripheral equipment stored in the storage means. Accordingly, an application program can be designed without taking packing/unpacking of data and the addressing type into consideration, and consequently, an application program of high universality can be provided.

Preferably, the bus width and the addressing type of the peripheral equipment stored in the storage means are re-writable so that, even if the specifications of the peripheral equipment are modified or a new peripheral equipment is added, such a situation does not make it impossible to use the apparatus.

The storage means may store at least a hold time or a recovery time of the peripheral equipment. In this instance, the timing can be controlled in accordance with the hold time or the recovery time.

Preferably, the bus width of the main bus is greater than the bus width of the sub bus, and more preferably, the bus width of the main bus is equal to an integral number of times the bus width of the sub bus.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 3 is a timing table illustrating operation of the computer shown in FIG.. 1;

FIG. 4 is a bus width table showing bus widths and addressing types employed in the computer shown in FIG. 1;

DETAILED DESCRIPTION OF THE PREFERRED EMBODIMENT

Figure 1:
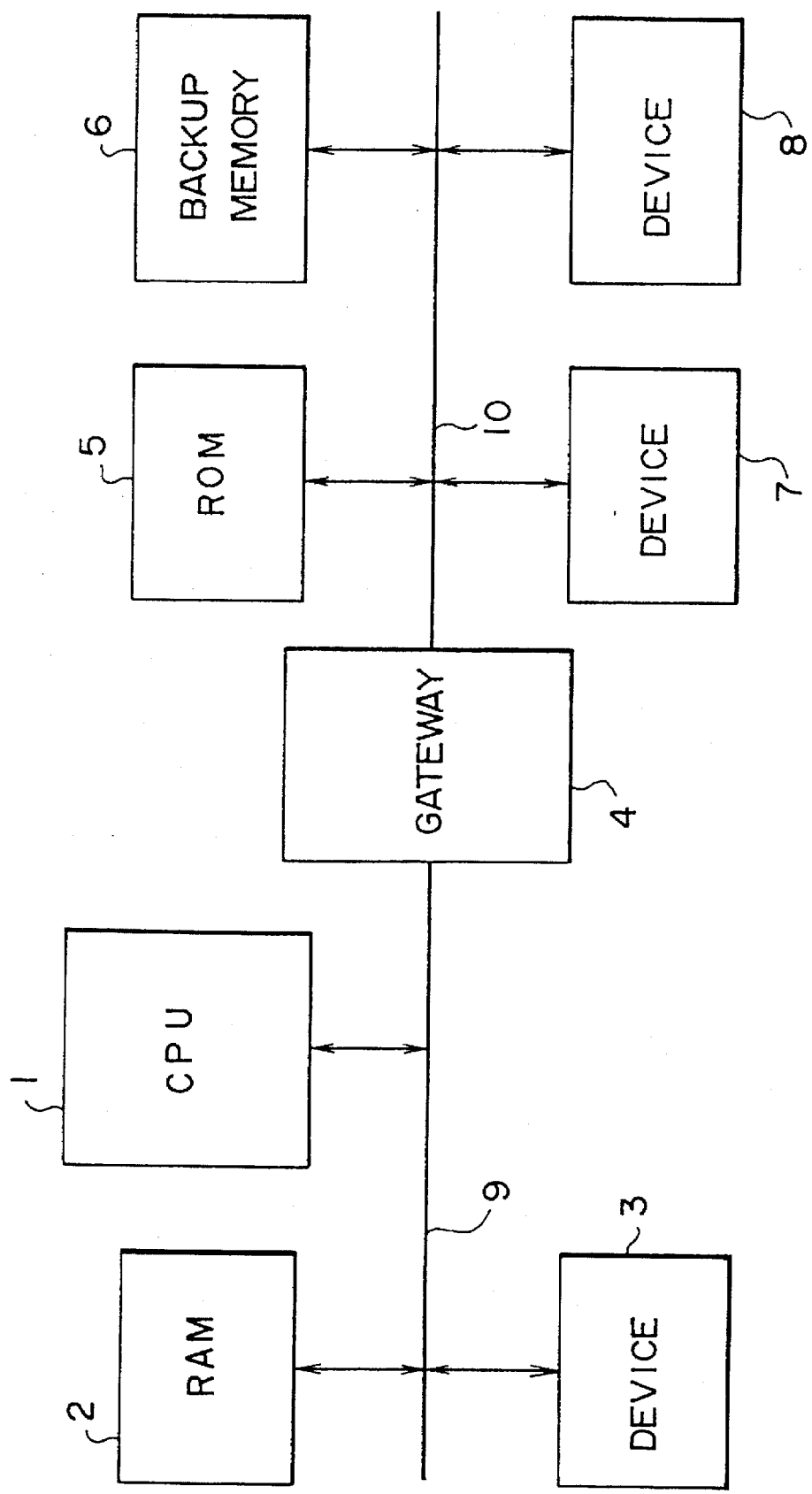
FIG. 1 is a block diagram showing a computer to which a bus control apparatus of the present invention is applied.

Referring first to FIG. 1, there is shown a computer which includes a gateway to which a bus control apparatus of the present invention is applied. The computer shown include a CPU 1 which may be, for example, a 32-bit CPU and executes predetermined processes in accordance with a system program stored in a ROM (read only memory) 5 and/or an application program stored in a RAM (random access memory) 2. The RAM 2 is, for example, a high speed DRAM (dynamic RAM) of a 32-bit width and temporarily stores an application program or data necessary for operation of the system. A device 3 is, for example, a high speed device of a 32-bit width and performs predetermined processing such as sound processing or image processing.

The CPU 1, the RAM 2 and the device 3 are connected to a main bus 9 in the form of a 32-bit high speed bus, and data of 32 bits are communicated at a high speed between the CPU 1 and the RAM 2 or the device 3 by way of the main bus 9.

The ROM 5 is, for example, a ROM of an 8-bit width and stores a system program stored in advance therein. A backup memory 6 is, for example, a memory of a 16-bit width and stores data as backup data. A device 7 is, for example, a device of an 8-bit width and executes predetermined processing such as sound processing or image processing. Another device 8 is, for example, an input/output interface of a 16-bit width.

The ROM 5, the memory 6 and the devices 7 and 8 operate at a operation speed lower than that of the CPU 1 and are connected to a sub bus 10 as a general purpose bus of, for example, 16 bits. It is to be noted, however, that the ROM 5 and the device 7 of an 8-bit width are connected to the lower 8 bits of the sub bus 10 of 16 bits.

It is to be noted that, though not shown, the main bus 9 and the sub bus 10 are each constituted from a data bus, an address bus and a control bus.

A gateway 4 is connected between the main bus 9 and the sub bus 10 and controls communications of data between the CPU 1 and the ROM 5, the memory 6 or the device 7 or 8.

Figure 2:
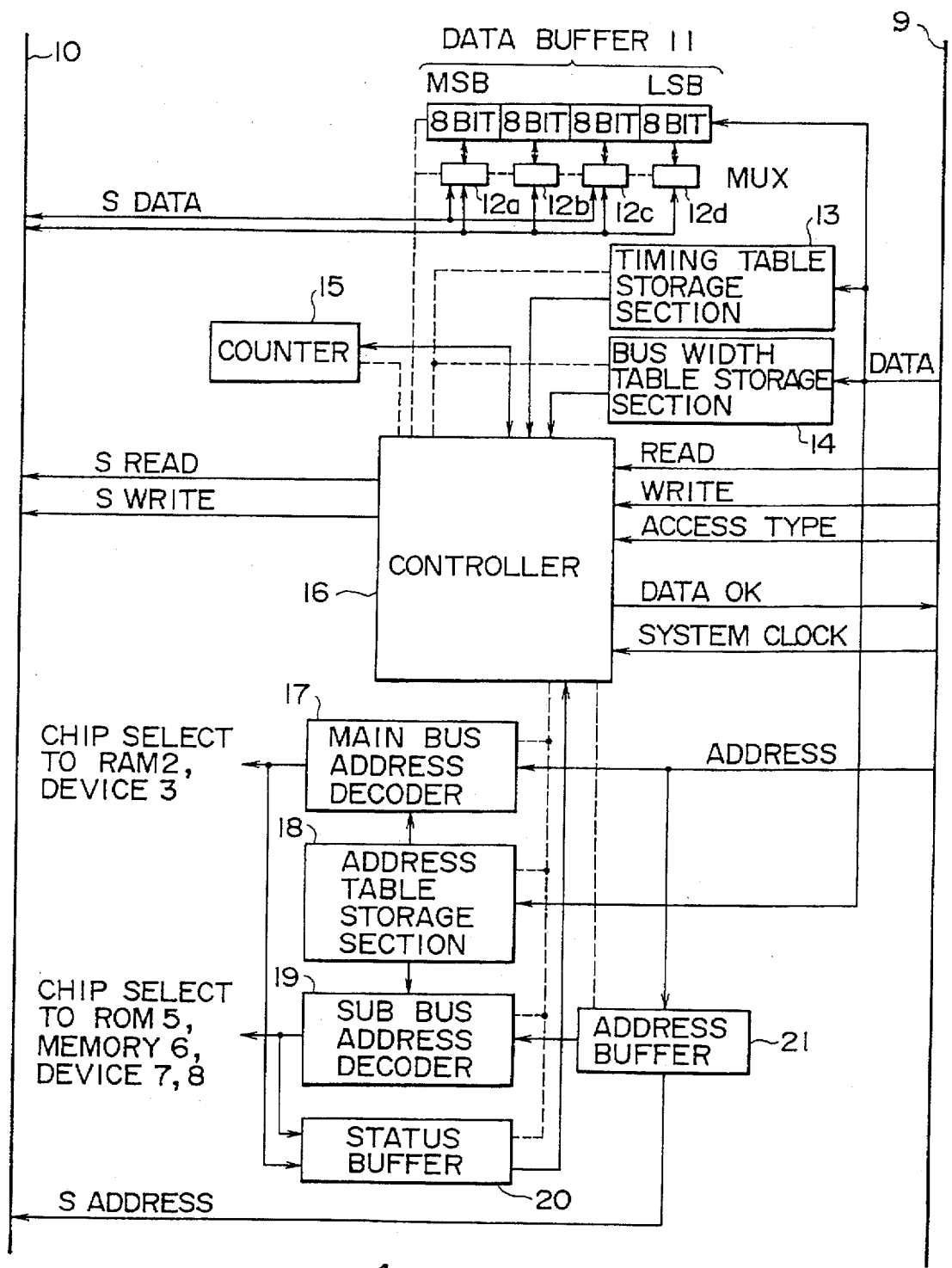
FIG. 2 is a detailed block diagram of a gateway of the computer shown in FIG. 1.

Referring now to FIG. 2, the gateway 4 includes, for example, a data buffer 11, four multiplexers (MUX) 12a to 12d, a timing table storage section 13, a bus width storage section 14, a counter 15, a controller 16, a main bus address decoder 17, an address table storage section 18, a sub bus address decoder 19, a status buffer 20, and an address buffer 21.

It is to be noted that each broken line in FIG. 2 denotes a control signal line.

The data buffer 11 is controlled by the controller 16 such that it latches data of 32 bits supplied thereto from the CPU 1 by way of the main bus 9 and outputs four data of 8 bits from the uppermost bit of the 32-bit data to the multiplexers 12a to 12d, respectively. Meanwhile, the data buffer 11 latches data from the multiplexers 12a to 12d of 8 bits and outputs them as 32-bit data to the main bus 9.

The multiplexers 12a to 12d constructed with an 8-bit width are controlled by the controller 16 such that they latch four data of 8 bits from the data buffer 11 and output them as two data of 16 bits or four data of 8 bits to the sub bus 10. Meanwhile, the multiplexers 12a to 12d latch two data of 16 bits or four data of 8 bits from the sub bus 10 and outputs them as data of 32 bits to the data buffer 11.

The timing table storage section 13 stores in advance therein such a timing table as shown in FIG. 3 in which, for example, read delay times, write delay times, hold times, floating times and recovery times of the ROM 5, the memory 6 and the devices 7 and 8 connected to the sub bus 10 are described.

It is to be noted that the read delay time or the write delay time signifies the access time when data are read or written, respectively, and the hold time signifies the time for which data must be held on a bus after outputting of a write signal comes to an end. Further, the floating time signifies the time for which data must be held on a bus even after reading of data comes to an end, and the recovery time signifies the time interval necessary when a same peripheral equipment is to be connected and accessed (the interval of time which must be provided before a next access after a first access comes to an end).

The bus width table storage section 14 stores in advance a bus width table as illustrated in FIG. 4 in which the data lengths (hereinafter referred to as bus widths) handled by the ROM 5, the memory 6, and the devices 7 and 8 connected to the sub bus 10 and the addressing types of them are described.

It is to be noted that, in the bus width table of FIG. 4, any peripheral equipment whose addressing type is fixed (in the present embodiment, the devices 7 and 8) has a data buffer of, for example, the FIFO type and requires designation of a predetermined same address (fixed address) upon reading or writing of data divided into a plurality of sets by unpacking. On the other hand, any other peripheral equipment whose addressing type is variable (in the present embodiment, the ROM 5 and the memory 6) requires, upon reading or writing of data divided into a plurality of sets by unpacking, incrementing or decrementing of the address to designate a new address for reading or writing of data of a next data set after reading or writing of data of one of the data sets.

The counter 15 counts a system clock (System Clock) supplied thereto from a clock generator not shown by way of the main bus 9 and the controller 16.

The controller 16 varies the timing of a read (Read) signal or a write (Write) signal supplied thereto from the CPU 1 by way of the main bus 9 in accordance with the timing table (FIG. 3) stored in the timing table storage section 13 and outputs a resulted signal as an SRead signal or an SWrite signal to the sub bus 10. Further, the controller 16 outputs a DataOK signal, which will be hereinafter described, at a predetermined timing in accordance with the timing table (FIG. 3) stored in the timing table storage section 13.

Furthermore, the controller 16 controls the data buffer 11 in accordance with a bus width described in the bus width table (FIG. 4) stored in the bus width table storage section 14 and an AccessType (length of data handled by the CPU 1) supplied thereto from the CPU 1 by way of the main bus 9 to pack or unpack data. Meanwhile, the controller 16 controls the address buffer 21 in accordance with an addressing type described in the bus width table (FIG. 4) stored in the bus width table storage section 14.

The main bus address decoder 17 decodes an address (Address) outputted from the CPU 1 by way of the main bus 9 and compares a result of such decoding with an address decode table stored in the address table storage section 18. The main bus address decoder 17 then determines from a result of the comparison whether the peripheral equipment the CPU 1 tries to access is the RAM 2 or the device 3 connected to the main bus 9, and if it determines that the peripheral equipment is the RAM 2 or the device 3, it outputs a chip select signal to the RAM 2 or the device 3 by way of the main bus 9.

The address table storage section 18 stores in advance the address decode table in which results of decoding of addresses allocated to the RAM 2, the device 3, the ROM 5, the memory 6 and the devices 7 and 8 are described.

The sub bus address decoder 19 decodes an address outputted from the CPU 1 by way of the main bus 9 and the address buffer 21 and compares a result of such decoding with the results of decoding of the addresses described in the address decode table of the address table storage section 18 and allocated to the RAM 2, the device 3, the ROM 5, the memory 6, and the devices 7 and 8. The sub bus address decoder 19 then determines from a result of the comparison whether or not the peripheral equipment the CPU 1 tries to access is the ROM 5, the memory 6, or the device 7 or 8 connected to the sub bus 10, and outputs, when it determines that the peripheral equipment is one of the peripheral equipments connected to the sub bus 10 (that is, one of the ROM 5, the memory 6, and the devices 7 and 8), a chip select signal to the peripheral equipment by way of the sub bus 10.

The status buffer 20 stores a peripheral equipment to which one of the main bus address decoder 17 and the sub bus address decoder 19 has outputted a chip select signal last, that is, that one of the peripheral equipments which has been accessed last by the CPU 1 (a result of decoding of the address allocated to the peripheral apparatus). Further, when the stored value of the status buffer 20 is the same as that one of the peripheral equipments to which the sub bus address decoder 19 has outputted the chip select signal, that is, when accessing to an arbitrary one of the peripheral equipments connected to the sub bus 10 has occurred successively, the status buffer 20 outputs a control signal to the controller 16 to execute recovery processing which will be hereinafter described.

The address buffer 21 latches an address supplied thereto from the CPU 1 by way of the main bus 9. The address buffer 21 then holds the thus latched address as it is or increments (or decrements) the latched address by one at a predetermined timing.

Subsequently, operation of the computer will be described. In order to facilitate description, control of the timings and control of the bus width and the addressing type which are actually performed simultaneously will be described separately from each other below.

First, control of the timings will be described with reference to the time charts of FIGS. 5(a)–5(i) and 6(a)–6(i). It is to be noted that, in FIGS. 5(a)–5(i) and 6(a)–6(i), the signals Read, DataOk, ChipSelect, SRead, and SWrite are indicated in the active-low logic. Further, it is assumed that each block of the system operates in synchronism with the timing of a rising edge of a system clock FIG. 5(a) and FIG. 6(a).

When, for example, the CPU 1 tries to read out data of one byte (8 bits) from the device 7, the address (Address) FIG. 5(c)) allocated to the device 7 is outputted from the CPU 1 by way of the main bus 9 so that it is latched by the address buffer 21 and inputted to the main bus address decoder 17.

The address latched by the address buffer 21 is outputted as a signal SAddress (FIG. 5(h)) to the sub bus 10 and outputted also to the sub bus address decoder 19.

The main bus address decoder 17 and the sub bus address decoder 19 decode the address received from the CPU 1, and results of the decoding are compared with the address decode table stored in the address table storage section 18.

Since the address allocated to the device 7 is held outputted from the CPU 1 as described above, it is detected by the sub bus address decoder 19 that the peripheral equipment the CPU 1 tries to access is the device 7, and a chip select signal (ChipSelect) (FIG. 5(f)) is outputted from the CPU 1 to the device 7 by way of the sub bus 10.

The result of decoding of the sub bus address decoder 19 is stored into the status buffer 20 and then outputted from the status buffer 20 to the controller 16. Consequently, it is recognized by the controller 16 that the object for accessing of the CPU 1 is the device 7.

Further, a read signal (Read) (FIG. 5(b)) and an accessing type signal (AccessType) indicative of byte accessing are supplied from the CPU 1 to the controller 16 by way of the main bus 9.

When the controller 16 receives the read signal (Read) from the CPU 1, it outputs a read signal (SRead) (FIG. 5(g)) to the sub bus 10.

Here, the device 7 has a read delay time of 2 clocks as seen from the timing table of FIG. 3. In particular, a time for two clocks is required before the device 7 outputs data to the sub bus 10 after a chip select signal and a read signal (SRead) are supplied thereto.

Thus, after the controller 16 outputs the read signal (SRead) to the sub bus 10, it resets the counter 15 and causes the counter 15 to start counting beginning with 0 at the timing of a system clock (FIG. 5(a)).

Further, the controller 16 refers to the read delay time of the device 7 described in the timing table (FIG. 3) of the timing table storage section 13 and places a waiting time until the count value of the counter 15 becomes equal to the read delay time of the device 7.

Accordingly, in this instance, the waiting time of 2 clocks is placed after the read signal (SRead) is outputted.

After the time for two clocks elapses after the read signal (SRead) is outputted to the sub bus 10, one-byte data (SData) (FIG. 5(i)) are outputted from the device 7 to the lower 8 bits of the sub bus 10 of 16 bits, and a control signal based on the 8-bit (one-byte) signal AccessType representative of an accessing type from the CPU 1 is outputted from the controller 16 to the multiplexer 12d and the data buffer 11 so that data of the lower 8 bits of the sub bus 10 may be latched.

Consequently, the one-byte data (SData) from the device 7 are latched at the lower 8 bits of the data buffer 11 by way of the multiplexer 12d.

After the data (SData) from the device 7 are latched by the data buffer 11, a DataOk signal (FIG. 5(e)) indicating that it is enabled to output data from the device 7 to the main bus 9 is supplied from the controller 16 to the CPU 1 by way of the main bus 9, and the read signal (SRead) (FIG. 5(g)) which has been outputted from the controller 16 to the sub bus 10 is stopped.

Further, in this instance, the controller 16 resets the counter 15 so that the counter 15 starts counting beginning with 0 at the timing of a system clock (FIG. 5(a)).

Then, the data latched by the data buffer 11 are outputted to the main bus 9 (FIG. 5(d)) so that they are read in by the CPU 1.

The CPU 1 then stops outputting of the read signal (Read) (FIG. 5(b)) and the address (Address) (FIG. 5(c)) to the main bus 9. After the CPU 1 stops outputting of the read signal (Read) (FIG. 5(b)) to the main bus 9, the controller 16 causes the sub bus address decoder 19 to stop outputting of the chip select signal (ChipSelect) (FIG. 5(f)) to the device 7.

Thereafter, the controller 16 causes, after the floating time of the device 7 elapses after the time at which the data from the device 7 are latched by the data buffer 11 (reading of the data comes to an end) and outputting of the data (SData) (FIG. 5(i)) from the device 7 to the sub bus 10 is stopped, that is, the count value of the counter 15 becomes equal to the floating time of the device 7 described in the timing table (FIG. 3), the address buffer 21 to stop outputting of the address (SAddress) (FIG. 5(h)) to the sub bus 10.

By the way, the CPU 1 recognizes, at the point of time when outputting of the address (Address) (FIG. 5(c)) to the main bus 9 is stopped as described above, that accessing to the device 7 has been completed (actually such accessing has been completed with the CPU 1).

Figure 5:
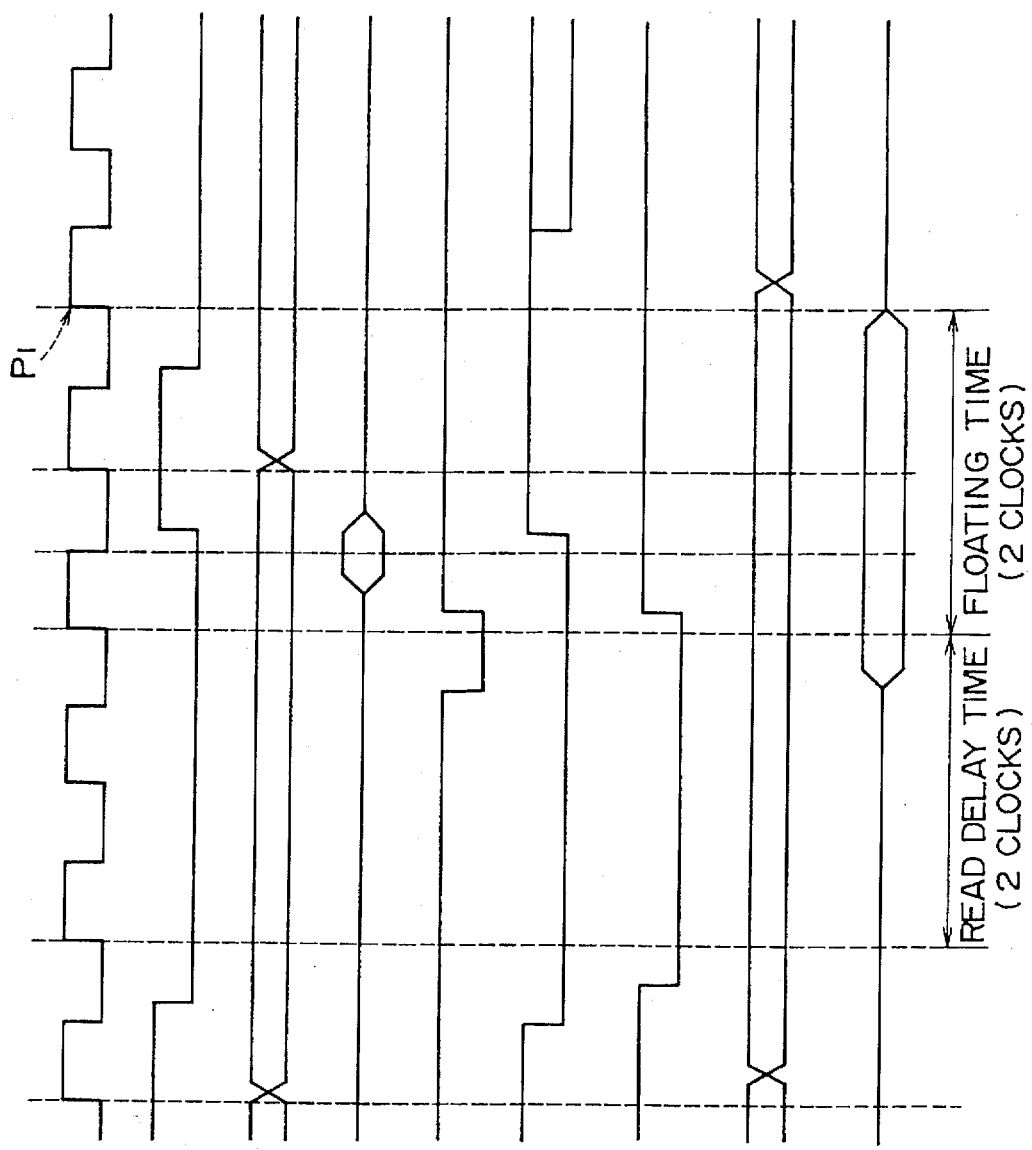
FIGS. 5(a)-5(i) represent a time chart illustrating operation of the computer shown in FIG. 1 when data are read out from a first device to a CPU.

Accordingly, if the case wherein, for example, it is tried to write data into the memory 6 connected to the sub bus 10 immediately after the CPU 1 stops outputting of the address (Address) (FIG. 5(c)) to the main bus 9 is considered, then for a time until the floating time (2 clocks) of the device 7 elapses after the point of time when data from the device 7 are latched by the data buffer 11 (reading of data comes to an end), that is, for a time until the point of time indicated as $P_1$ in FIG. 5 is passed, the device 7 continues to output the data (SData) to the sub bus 10, and accordingly, the data come across on the sub bus 10 with data outputted from the CPU 1 to the memory 6.

Therefore, the gateway 4 is constructed so that, in this instance, the data outputted from the CPU 1 are latched by the data buffer 11 and a signal DataOk indicating that writing of data into the memory 6 has been completed is outputted from the controller 16 to the CPU 1.

Consequently, the CPU 1 recognizes that writing of data into the memory 6 has been completed (although such writing has not been completed as yet). Accordingly, the main bus 9 is released immediately, and the CPU 1 can thereafter execute any processing except the process of accessing to any of the peripheral equipments connected to the sub bus 10.

Meanwhile, in the gateway 4, after waiting that the floating time of the device 7 has elapsed after the point of time when data from the device 7 are latched by the data buffer 11 (reading of data comes to an end) waiting until the time point $P_1$ comes), a write signal (SWrite), a chip select signal or an address (SAddress) is outputted from the controller 16, the sub bus address decoder 19 or the address buffer 21 to the memory 6 by way of the sub bus 10. Then, the data from the CPU 1 latched by the data buffer 11 are outputted and written into the memory 6 by way of the sub bus 10.

Accordingly, in this instance, the CPU 1 can execute writing processing of data into the memory without waiting the lapse of the floating time of the device 7 after the point of time at which data from the device 7 are latched by the data buffer 11 (reading of data comes to an end). Consequently, the processing speed of the entire apparatus can be enhanced.

Further, in this instance, writing processing of data into the memory 6 is transferred from the CPU 1 to the gateway 4 and accordingly is thereafter executed by the gateway 4. Accordingly, the CPU 1 can immediately execute any other processing. Consequently, access timings between the CPU 1 and the peripheral equipments need not be considered, which facilitates development of an application program.

Figure 6:
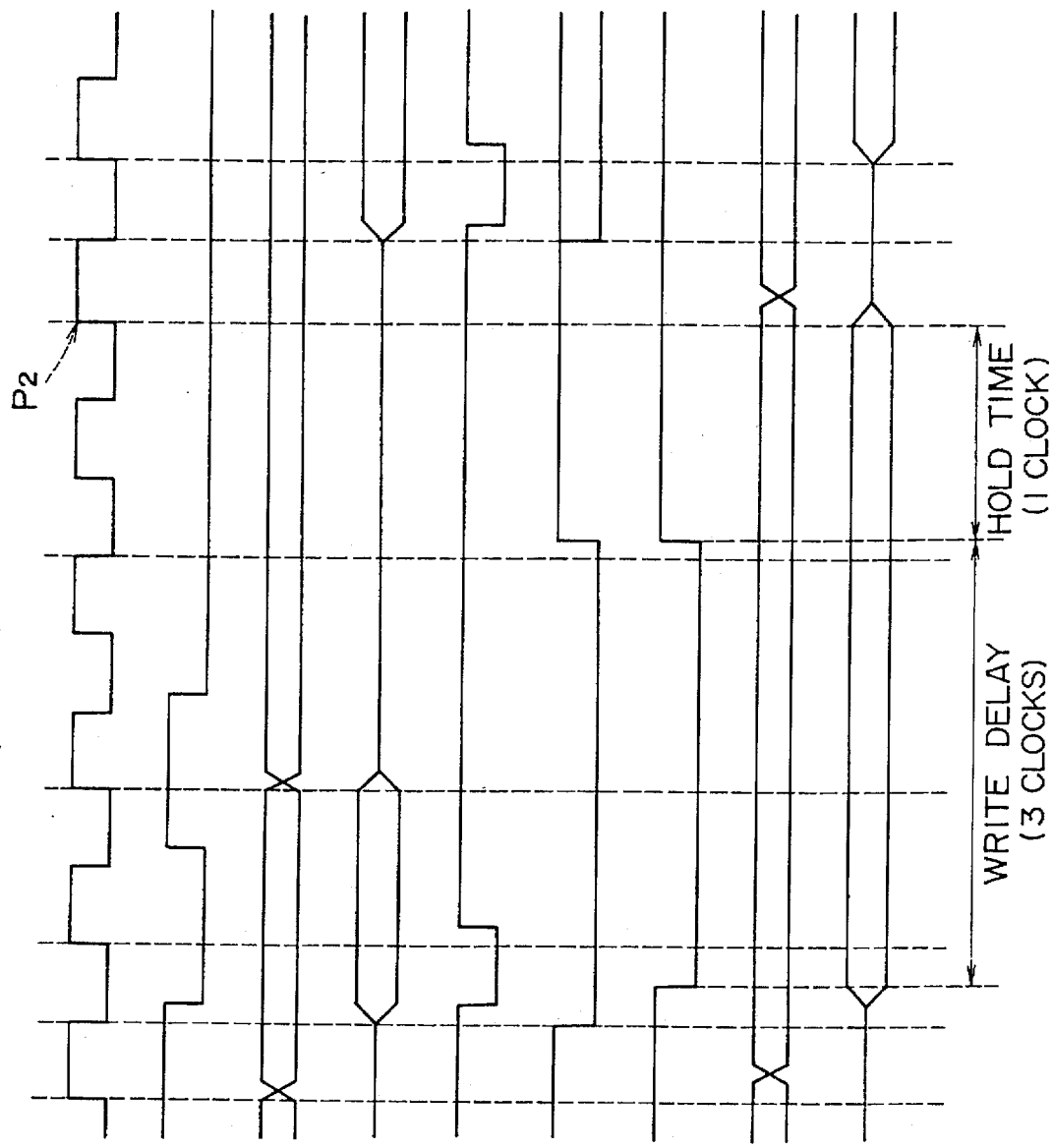
FIGS. 6(a)-6(i) represent similar time chart but illustrating operation of the computer shown in FIG. 1 when data are written from the CPU to a second device.

FIGS. 6(a)-6(i) illustrate writing processing of data from the CPU 1 into the device 8. Referring to FIG. 6(c), the address allocated to the device 8 is first outputted from the CPU 1 by way of the main bus 9. The address is latched by the address buffer 21 and inputted to the main bus address decoder 17.

The address latched by the address buffer 21 is outputted as a signal SAddress (FIG. 6(h)) to the sub bus 10 and outputted also to the sub bus address decoder 19.

The address from the CPU 1 is decoded by the main bus address decoder 17 and the sub bus address decoder 19, and results of such decoding are compared with the address decode table stored in the address table storage section 18.

Since the address allocated to the device 8 is held outputted from the CPU 1 as described above, it is detected by the sub bus address decoder 19 that the peripheral equipment the CPU 1 tries to access is the device 8, and a chip select signal (ChipSelect) (FIG. 6(f)) is outputted from the sub bus address decoder 19 to the device 8 by way of the sub bus 10.

The result of decoding of the sub bus address decoder 19 is stored into the status buffer 20 and then outputted from the status buffer 20 to the controller 16. Consequently, the controller 16 recognizes that the object for accessing of the CPU 1 is the device 8.

Further, from the CPU 1, a write signal (Write) (FIG. 6(b)) is supplied to the controller 16 by way of the main bus 9 and data (Data) are supplied to and latched by the data buffer 11.

After the data (Data) from the CPU 1 are latched by the data buffer 11, the controller 16 supplies a DataOk signal (FIG. 6(e)) indicating that writing of the data (Data) into the device 8 has been completed (although such writing has not been completed as yet) to the CPU 1 by way of the main bus 9.

Upon reception of the DataOk signal, the CPU 1 recognizes that writing of the data (Data) has been completed, and stops outputting of the write signal (Write), the address (Address) and the data (Data), whereafter it executes next processing.

Meanwhile, upon reception of the write signal (Write) from the CPU 1, the controller 16 outputs a write signal (SWrite) (FIG. 6(g)) to the sub bus 10 and outputs a control signal to the data buffer 11 to output the latched data as a signal SData (FIG. 6(i)) to the sub bus 10.

Consequently, data (Sdata) are outputted from the data buffer 11 to the sub bus 10.

Here, the device 8 has a write delay time of 3 clocks as seen from the timing table of FIG. 3. In particular, the device 8 requires the time for three clocks before data are read from the sub bus 10 after a chip select signal and a write signal (SWrite) are supplied thereto.

Further, the device 8 has a hold time of one clock. In particular, when it is tried to perform writing of data into the device 8 (in order to assure writing of data into the device 8), the data (SData) and the address (SAddress) must supplied to the sub bus 10 before the time at least for one clock elapses after supplying of the write signal (SWrite) is stopped.

Thus, the controller 16 first resets, after it outputs a write signal (SWrite) (FIG. 6(g)) to the sub bus 10, the counter 15 and then causes the counter 15 to start counting beginning with 0 at the timing of a system clock (FIG. 6(a)).

Further, the controller 16 refers to the write delay time of the device 8 described in the timing table (FIG. 3) of the timing table storage section 13 and places a waiting time until after the count value of the counter 15 becomes equal to the write delay time of the device 8.

Accordingly, in this instance, after the write signal (SWrite) is outputted, a waiting time for three clocks is placed.

When the time for three clocks elapses after the write signal (SWrite) is outputted to the sub bus 10, outputting of the write signal (SWrite) and the chip select signal from the controller 16 is stopped.

After the controller 16 stops outputting of the write signal (SWrite) (FIG. 6(g)), it resets the counter 15 and then causes the counter 15 to start counting beginning with 0 at the timing of a system clock (FIG. 6(a)).

Thereafter, the controller 16 refers to the hold time of the device 8 described in the timing table (FIG. 3) of the timing table storage section 13 and places a waiting time until after the count value of the counter 15 becomes equal to the hold time of the device 8.

Accordingly, in this instance, a waiting time for one clock is placed after outputting of the write signal (SWrite) is stopped.

When the time for one clock elapses after outputting of the write signal (SWrite) is stopped (at a timing (the point of time denoted as $P_2$ in FIG. 6(a) representing a first rising edge of the system clock signal after lapse of more than one clock), outputting of the data (Sdata) or the address (SAddress) from the data buffer 11 or the address buffer 21 is stopped, thereby completing the writing processing of data into the device 8.

The accessing timings to the device 8 which has a hold time are controlled in such a manner as described above so that writing of data into the device 8 is assured (data are written accurately into the device 8).

Further, writing processing of data into the device 8 is transferred from the CPU 1 to the gateway 4 so that the writing processing is thereafter executed by the gateway 4. Accordingly, the CPU 1 can immediately execute any other processing as described above, and consequently, the processing speed of the entire apparatus can be enhanced.

Subsequently, when, for example, writing of data into the memory 6 is successively performed twice (when the memory 6 is successively performed accessed twice), similar processing to that in the writing processing of data into the device 8 as described above is first performed for the first time.

In particular, the gateway 4 executes timing control taking the write delay time (FIG. 3) of the memory 6 into consideration (the hold time (FIG. 3) of the memory 6 is ignored since it is equal to 0).

Here, the memory 6 has a recovery time of 10 clocks as seen from the timing table of FIG. 3. In particular, second accessing of the memory 6 is not assured before 10 clocks elapses after first accessing comes to an end.

Thus, in the gateway 4, after second accessing of the memory 6 is started after completion of first accessing of the memory 6 and a result of decoding of the address allocated to a peripheral equipment to which the sub bus address decoder 19 has outputted a chip select signal is supplied to the status buffer 20, the result of the decoding is compared with a stored value currently stored in the status buffer 20.

Here, when the first writing processing of data into the memory 6 comes to an end, the last result of decoding of the sub bus address decoder 19, that is, the fact that the peripheral equipment which has been accessed last is the memory 6, is stored in the status buffer 20.

Accordingly, in this instance, it is determined that the result of decoding just outputted from the sub bus address decoder 19 is equal to the stored value stored in the status buffer 20.

Consequently, the controller 16 executes recovery processing.

In particular, the controller 16 first resets the counter 15 and causes the counter 15 to start counting beginning with 0 at the timing of a system clock.

Simultaneously, the controller 16 refers to the recovery time of the memory 6 described in the timing table (FIG. 3) of the timing table storage section 13, and if the recovery time is longer than 0, the controller 16 places a waiting time until the count value of the counter 15 becomes equal to the recovery time of the memory 6.

Accordingly, in this instance, after the first accessing to the memory 6 comes to an end, a waiting time (interval) of 10 clocks is placed, and thereafter, second writing of data into the memory 6 is performed.

The accessing timing to the memory 6 which has a recovery time is controlled in such a manner as described above, and even if access to the memory 6 occurs successively, the operation in such accessing is assured.

Meanwhile, data outputted as write data for the second time from the CPU 1 to the memory 6 after the completion of the first access to the memory 6 by the gateway 4 are latched immediately by the data buffer 11 of the gateway 4.

Then, a signal DataOk is outputted from the controller 16 to the CPU 1.

Consequently, the CPU 1 recognizes that writing of the data into the memory 6 has been completed (although actually the data have been merely latched by the data buffer 11 and writing of the data into the memory 6 is not completed as yet), and the main bus 9 is released. Accordingly, the CPU 1 can execute another processing immediately after the completion of the first accessing to the memory 6 by the gateway 4, and consequently, the processing speed of the entire apparatus can be enhanced.

It is to be noted that the timing table (FIG. 3) stored in the timing table storage section 13 can be rewritten by the CPU 1 executing a predetermined program. Accordingly, even if the specifications of, for example, any of the ROM 5, the backup memory 6, and the devices 7 and 8 are varied or a new peripheral equipment is added, it is only necessary to re-write the timing table, and such a situation that, for example, the compatibility of application software which has been used till now is lost to disable use of the application software is eliminated.

Subsequently, control of the bus width and the addressing type will be described with reference to the time charts of FIGS. 7(a)–7(i) and 8(a)–8(i). It is to be noted that, in FIGS. 7(a)–7(i) and 8(a)–8(i), the signals Read, DataOK, ChipSelect, Sread and SWrite are indicated in the active-low logic. Further, it is assumed that each block of the apparatus operates in synchronism with the timing of a rising edge of the system clock (FIGS. 7(a)–7(i) and FIGS. 8(a)–8(i).

Figure 7:
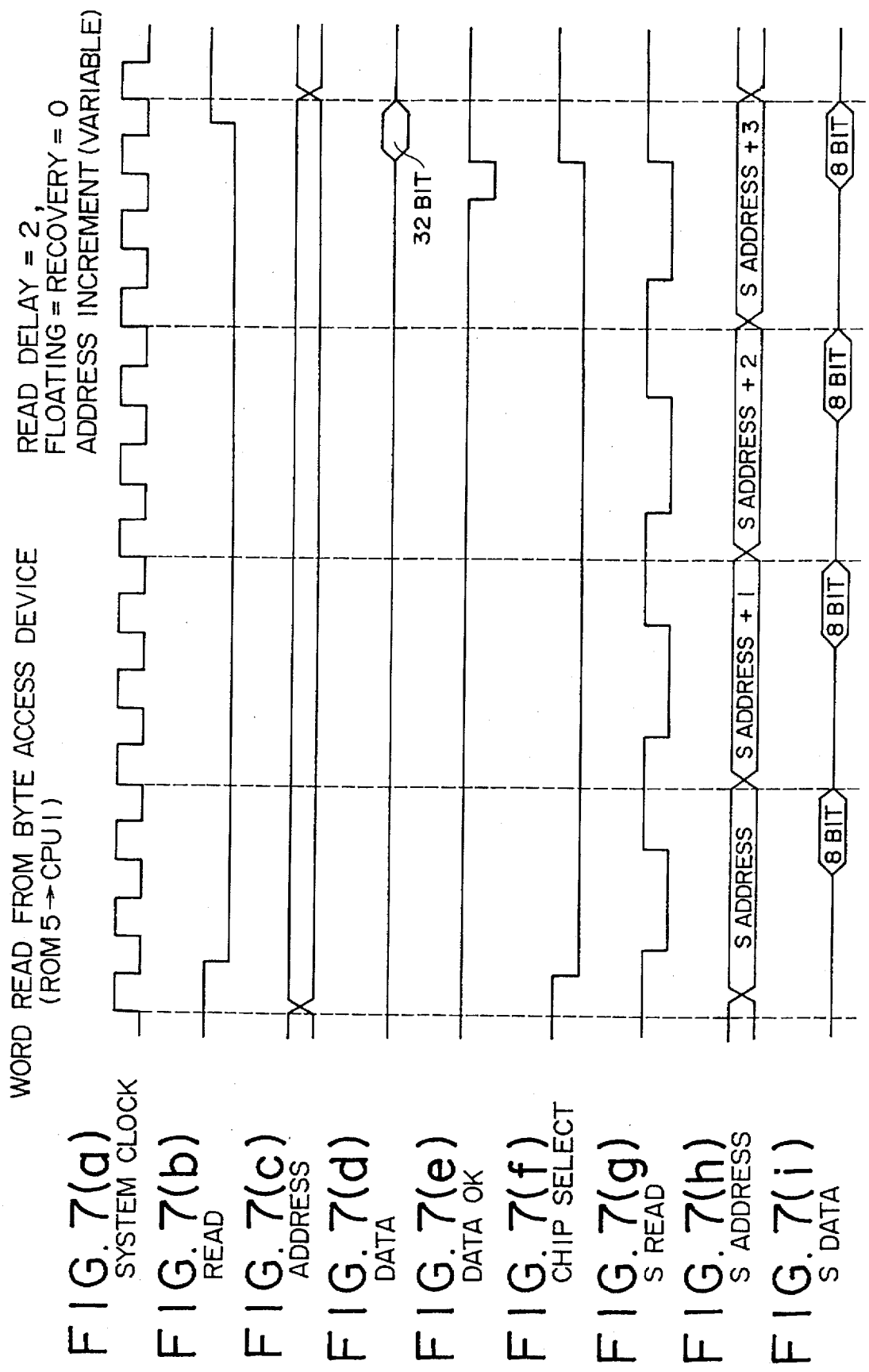
FIGS. 7(a)-7(i) represent another similar time chart but illustrating operation of the computer shown in FIG. 1 when data are read out from a ROM to the CPU.

For example, when the CPU 1 tries to read out data of 32 bits from the 8 bit ROM 5, an address (Address) (FIG. 7(c)) of the data to be read out from the ROM 5 is outputted from the CPU 1 by way of the main bus 9. The address is latched by the address buffer 21 and inputted to the main bus address decoder 17.

The address latched by the address buffer 21 is outputted as a signal SAddress (FIG. 7(h)) to the sub bus 10 and outputted to the sub bus address decoder 19.

The address from the CPU 1 is decoded by the main bus address decoder 17 and the sub bus address decoder 19, and a result of the decoding is compared with the address decode table stored in the address table storage section 18.

Since the address of the ROM 5 is outputted from the CPU 1 as described above, it is detected by the sub bus address decoder 19 that the peripheral equipment the CPU 1 tries to access is the ROM 5, and a chip select signal (ChipSelect) (FIG. 7(f)) is outputted from the sub bus address decoder 19 to the ROM 5 by way of the Sub bus 10.

The result of decoding of the sub bus address decoder 19 is stored into the status buffer 20 and then outputted from the status buffer 20 to the controller 16. Consequently, it is recognized by the controller 16 that the CPU 1 is attempting to access the ROM 5.

Further, a read signal (Read) (FIG. 7(b)) and an accessing type signal (AccessType) indicating that the length of data to be read out is 32 bits are supplied from the CPU 1 to the controller 16 by way of the main bus 9.

Upon reception of the read signal (Read) from the CPU 1, the controller 16 outputs a read signal (SRead) (FIG. 7(g)) to the sub bus 10.

Consequently, data of 8 bits (Sdata) (FIG. 7(i) are outputted from the address (SAddress) of the ROM 5 to the lower 8 bits of the 16 bit sub bus 10.

Here, the ROM 5 has a bus width of 8 bits and a variable addressing type as seen from the bus width table of FIG. 4. In other words, in order to read out data of 32 bits indicated by an accessing type signal (AccessType) from the ROM 5, the processing of reading out data in units of 8 bits as the bus width unit must necessarily be performed four times incrementing (or decrementing) the address.

Therefore, the controller 16 executes the following control in accordance with the accessing type signal (AccessType) received from the CPU 1 and the bus width and the addressing type of the ROM 5 described in the bus width table (FIG. 4) of the bus width table storage section 14.

In particular, where four data obtained by dividing data of 32 bits by 8 bits are represented, beginning with the uppermost 8 bits, by $d_4$, $d_3$, $d_2$ and $d_1$, if it is assumed that the four 8-bit data $d_4$, $d_3$, $d_2$ and $d_1$ are written at addresses of SAddress+3, SAddress+2, SAddress+1 and SAddress of the ROM 5, then the controller 16 first causes 8-bit data outputted from the address (SAddress) of the ROM 5 to the sub bus 10 as described above to be latched at the lower 8 bits of the data buffer 11 by way of the multiplexer 12d.

Thereafter, the controller 16 causes the address (SAddress (=Address)) latched in the address buffer 21 to be incremented by one and outputs the resulting new address (SAddress+1) to the ROM 5 by way of the sub bus 10.

Consequently, data of 8 bits are outputted from the address (SAddress+1) of the ROM 5 to the sub bus 10. The 8-bit data are latched at upper 8 bits of the lower 16 bits of the data buffer 11 by way of the multiplexer 12c.

Thereafter, data of 8 bits are read out successively from the addresses (SAddress+2 and SAddress+3) of the ROM 5 and latched successively by the data buffer 11 in a similar manner as described above. It is to be noted that, in this instance, the controller 16 turns the read signal (SRead) to the ROM 5 on or off as shown in FIG. 7(g) in response to the timing at which the address stored in the address buffer 21 is incremented.

After four 8-bit data read out from the addresses (SAddress, SAddress+1, SAddress+2 and SAddress+3) of the ROM 5 are latched by the data buffer 11 in such a manner as described above to form data of 32 bits, that is, after four data of 8 bits are packed into data of 32 bits, the controller 16 outputs a signal DataOK (FIG. 7(e)) to the CPU 1 by way of the main bus 9 and causes the data of 32 bits (FIG. 7(d)) latched in the data buffer 11 to be outputted to the main bus 9.

Upon reception of the signal DataOK, the CPU 1 reads the data of 32 bits on the main bus 9, thereby completing reading of the data of 32 bits from the ROM 5.

It is to be noted that the bus width table (FIG. 4) stored in the bus width table storage section 14 can be re-written by the CPU 1 executing a predetermined program. Accordingly, if, for example, the ROM 5 is changed from an 8-bit ROM to a 16-bit ROM, it is only necessary to change the bus width of the ROM 5 of the bus width table (FIG. 4) from 8 bits to 16 bits.

In this instance, two 16-bit data are read out from the ROM 5, and one of the two data, for example, the data of 16 bits of the lower address, are latched at the lower 16 bits of the data buffer 11 by way of the multiplexers 12c and 12d and the other of the two data, for example, the data of 16 bits of the upper address, are latched at the upper 16 bits of the data buffer 11 by way of the multiplexers 12a and 12b so that the two 16-bit data are packed into 32-bit data.

Subsequently, when the CPU 1 tries to write data of 32 bits into the device 7, an address (Address) (FIG. 8(c)) of the device 7 into which data are to be written is outputted from the CPU 1 by way of the main bus 9. The address is latched by the address buffer 21 and inputted to the main bus address decoder 17.

Figure 8:
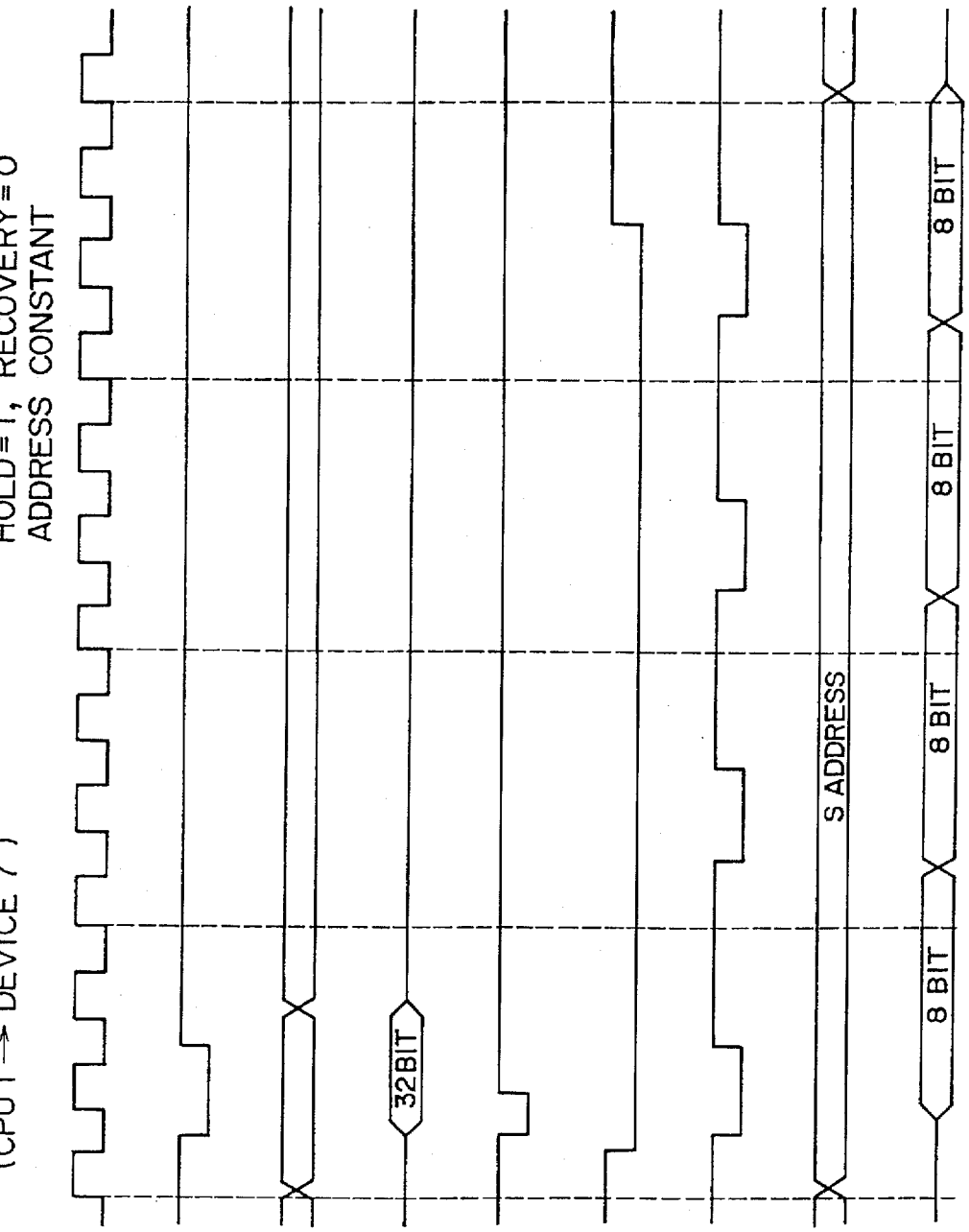
FIGS. 8(a)-8(i) represent another similar time chart but illustrating operation of the computer shown in FIG. 1 when data are written from the CPU to the first device.

The address latched by the address buffer 21 is outputted as a signal SAddress (FIG. 8(h)) to the sub bus 10, and is outputted to the sub bus address decoder 19.

The address from the CPU 1 is decoded by the main bus address decoder 17 and the sub bus address decoder 19, and a result of the decoding is compared with the address decode table stored in the address table storage section 18.

Since the address of the device 7 is outputted from the CPU 1 as described above, the sub bus address decoder 19 detects that the peripheral equipment the CPU 1 is trying to access is the device 7, and a chip select signal (ChipSelect) (FIG. 8(f)) is outputted from the sub bus address decoder 19 to the device 7 by way of the sub bus 10.

The result of decoding of the sub bus address decoder 19 is stored into the status buffer 20 and outputted from the status buffer 20 to the controller 16. Consequently, it is recognized by the controller 16 that the CPU 1 is attempting to access the device 7.

Further, a write signal (Write) and an accessing type signal (AccessType) indicating that the length of data to be written is 32 bits are supplied from the CPU 1 to the controller 16 by way of the main bus 9, and data (Data) (FIG. 8(d)) to be written into the device 7 are outputted from the CPU 1 to the main bus 9.

Upon reception of the write signal (Write) from the CPU 1, the controller 16 causes the data buffer 11 to latch the 32-bit data on the main bus 9 and outputs a write signal (SWrite) (FIG. 8(g)) to the sub bus 10.

Further, the controller 16 outputs a signal DataOK to the CPU 1. Consequently, the CPU 1 recognizes that writing of data into the device 7 has been completed (although such writing has not actually been completed as yet), and the main bus 9 is released. Accordingly, since the CPU 1 thereafter can execute any other processing immediately, the processing speed of the entire apparatus can be enhanced.

Here, the device 7 has a bus width of 8 bits and a fixed addressing type as seen from the bus width table of FIG. 4. In particular, in order to write data of 32 bits indicated by the accessing type signal (AccessType) into the device 7, it is necessary to divide the 32-bit data equally into four data of 8 bits to match the bus width of the device 7 and write the four 8-bit data to a fixed address.

Therefore, the controller 16 executes the following control in accordance with the accessing type signal (AccessType) received from the CPU 1 and a bus width and an addressing type of the device 7 described in the bus width table (FIG. 4) of the bus width table storage section 14.

In particular, the controller 16 causes data of 32 bits latched in the data buffer 11 to be read out into the 8-bit multiplexers 12a to 12d to unpack the data into four 8-bit data.

The controller 16 then causes the 8 bit data comprising the LSBs (least significant bits) of the 32-bit data read out by the multiplexer 12d to be outputted to the lower 8 bits of the sub bus 10. Consequently, the data of 8 bits is written into the address (SAddress) of the device 7.

Further, the controller 16 causes the address buffer 21 to output the data of next least significant 8 bits, which have been read out by the multiplexer 12c, while leaving the address buffer 21 to hold the stored address (SAddress), to the lower 8 bits of the sub bus 10. Consequently, the data of 8 bits is written into the address (SAddress) of the device 7.

Thereafter, the remaining two data of 8 bits read out from the data buffer 11 by the multiplexers 12b and 12a are successively written into the address (SAddress) of the device 7 in a similar manner as described above. It is to be noted that, in this instance, the controller 16 causes the multiplexers 12a to 12d to successively turn on and off the write signal (SWrite) to the device 7 as shown in FIG. 8(g) in accordance with the timing at which data are read out from the data buffer 11.

The device 7 has a buffer, for example, of the FIFO type, and the four data of 8 bits written into the address (SAddress) are successively stacked (loaded) into the buffer and are thereafter processed by predetermined processing of the device 7.

It is to be noted that, when, for example, the device 7 is changed from the device having a bus width of 8 bits to a device having another bus width of 16 bits, it is only necessary to change the bus width of the device 7 in the bus width table (FIG. 4) from 8 bits to 16 bits in a similar manner as described hereinabove.

In this instance, the data of lower 16 bits of the 32-bit data latched in the data buffer 11 are read out by the multiplexers 12c and 12d and the data of upper 16 bits are read out by the multiplexers 12a and 12b to unpack the 32-bit data into two 16-bit data.

Accordingly, even if the bus width or the addressing type of a peripheral equipment is changed or a new peripheral equipment is added, it is only necessary to re-write the bus width table, and such a situation that, for example, the compatibility of application software which has been used till now is lost to disable use of the application software is eliminated.

Figure 9:
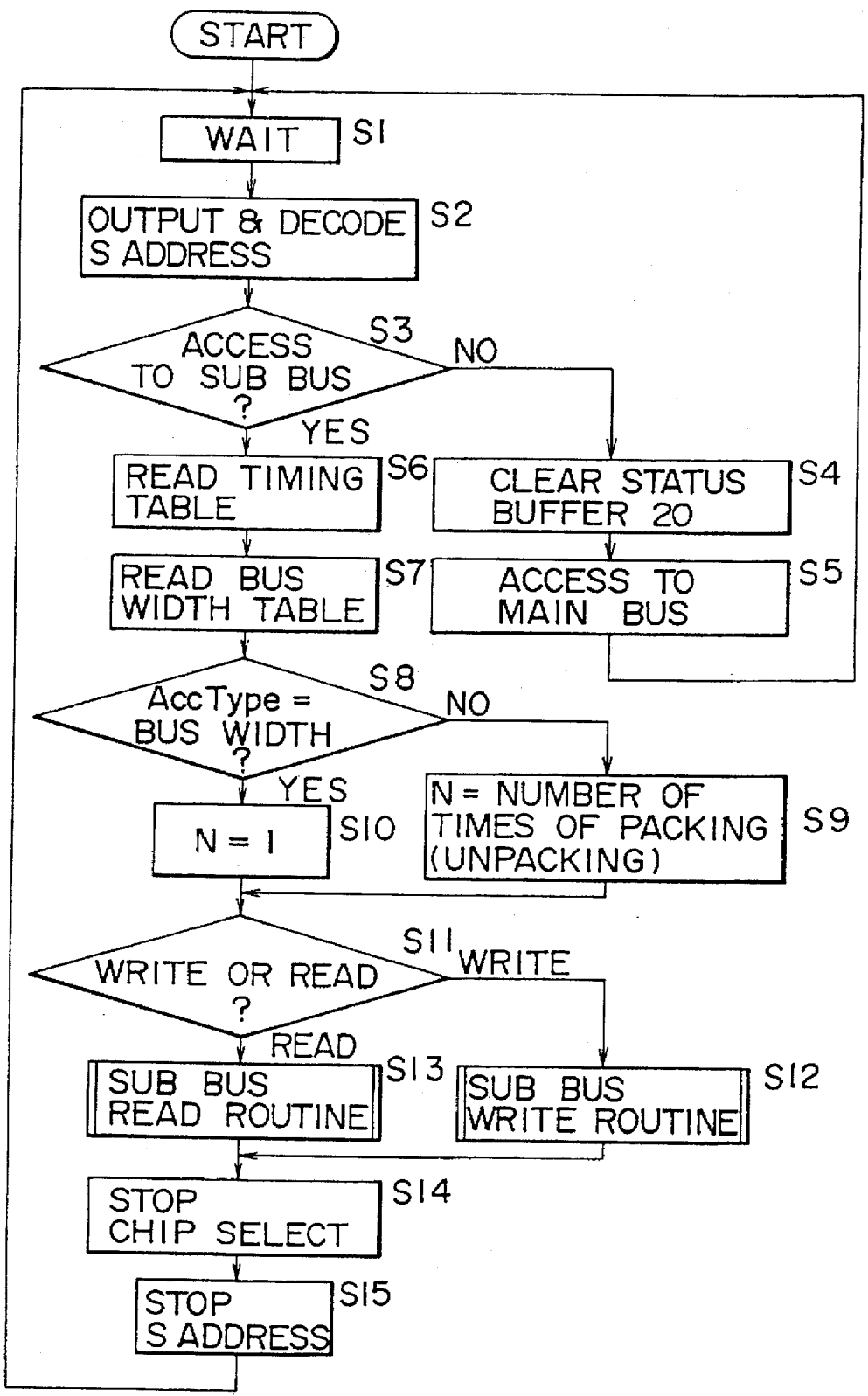
FIGS. 9 to 14 are flow charts illustrating operation of the gateway shown in FIG. 2.

While the control of the timings and the control of the bus width and the addressing type have been described separately from each other in order to facilitate understanding, those controls are executed parallelly or simultaneously as illustrated in a flow chart of FIG. 9 by the gateway 4 in accordance with the timing table (FIG. 3) and the bus width table (FIG. 4).

In particular, the gateway 4 first waits that an address is outputted together with a write signal or a read signal from the CPU 1 by way of the main bus 9. Then, after an address is outputted together with a write signal or a read signal from the CPU 1, the control sequence advances to step S2, at which the address from the CPU 1 is outputted to the peripheral equipments and decoding of the address is performed. Then, the gateway 4 outputs a chip select signal to one of the peripheral equipments indicated by a result of the decoding.

The control sequence then advances to step S3, where it is determined from the result of decoding of the address from the CPU 1 whether or not the peripheral equipment the CPU 1 tries to access is connected to the sub bus 10.

When it is determined at step S3 that the peripheral equipment the CPU 1 tries to access is not connected to the sub bus 10, that is, when the peripheral equipment the CPU 1 tries to access is connected to the main bus 9, the recovery processing described above need not be executed, and consequently, the control sequence advances to step S4, at which the status buffer 20 is cleared, whereafter the control sequence advances to step S5.

At step S5, CPU 1 accesses the peripheral equipments connected to the main bus 9, and after such accessing comes to an end, the control sequence returns to step S1 to repeat the processes beginning with step S1.

On the other hand, when it is determined at step S3 that the peripheral equipment the CPU 1 tries to access is connected to the sub bus 10, the control sequence successively advances to steps S6 and S7, at which the timing table and the bus width table are read out from the timing table storage section 13 and the bus width table storage section 14, respectively.

Thereafter, the control sequence advances to step S8, at which it is determined whether or not the accessing type of the CPU 1 and the bus width of the peripheral equipment the CPU 1 tries to access are equal to each other. When it is determined at step S8 that the accessing type of the CPU 1 and the bus width of the peripheral equipment the CPU 1 tries to access are equal to each other, the control sequence advances to step S10, at which a variable N is set to 1, whereafter the control sequence advances to step S11.

On the other hand, when it is determined at step S8 that the accessing type of the CPU 1 and the bus width of the peripheral equipment the CPU 1 tries to access are not equal to each other, the control sequence advances to step S9, at which the variable N is set to the number of times by which packing/unpacking should be performed, whereafter the control sequence advances to step S11.

At step S11, it is determined whether the signal outputted from the CPU 1 at step S1 is a write signal or a read signal.

If it is determined at step S11 that the signal outputted from the CPU 1 at step S1 is a read signal, the control sequence advances to step S13, at which reading processing of data from the peripheral equipment is performed.

Figure 10:
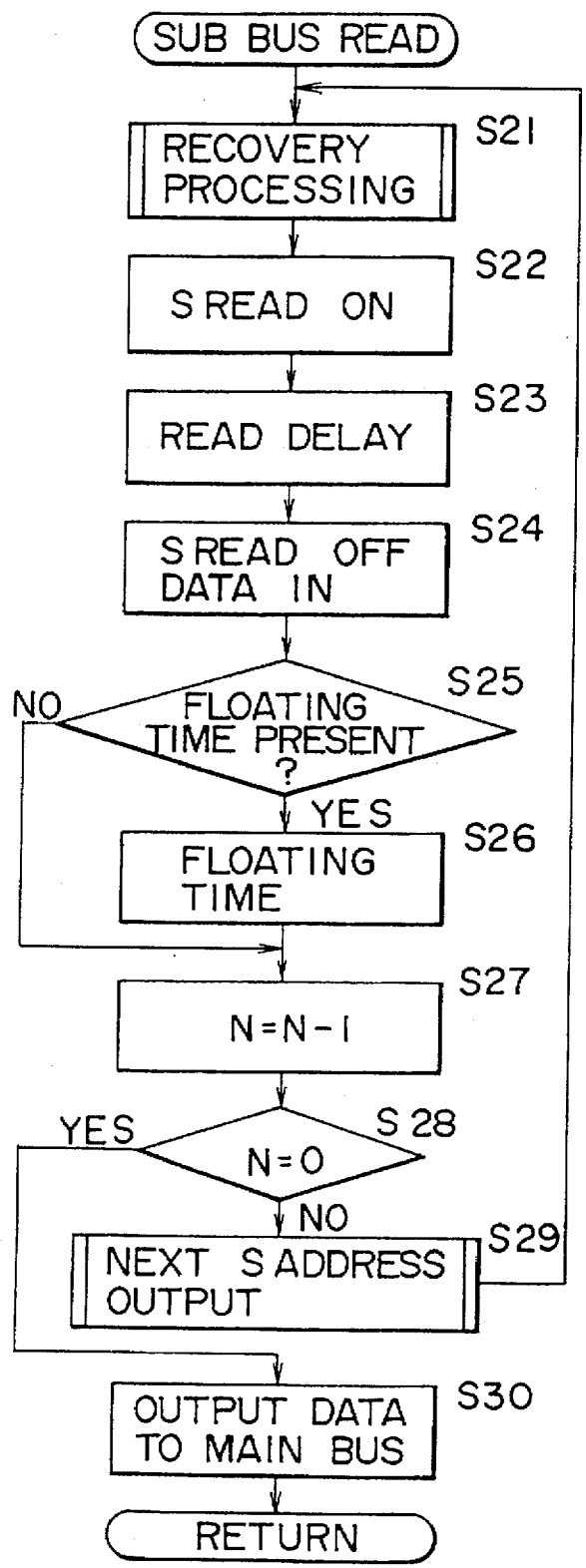

In particular, at step S13, recovery processing is first executed at step S21 as illustrated in FIG. 10.

Figure 11:
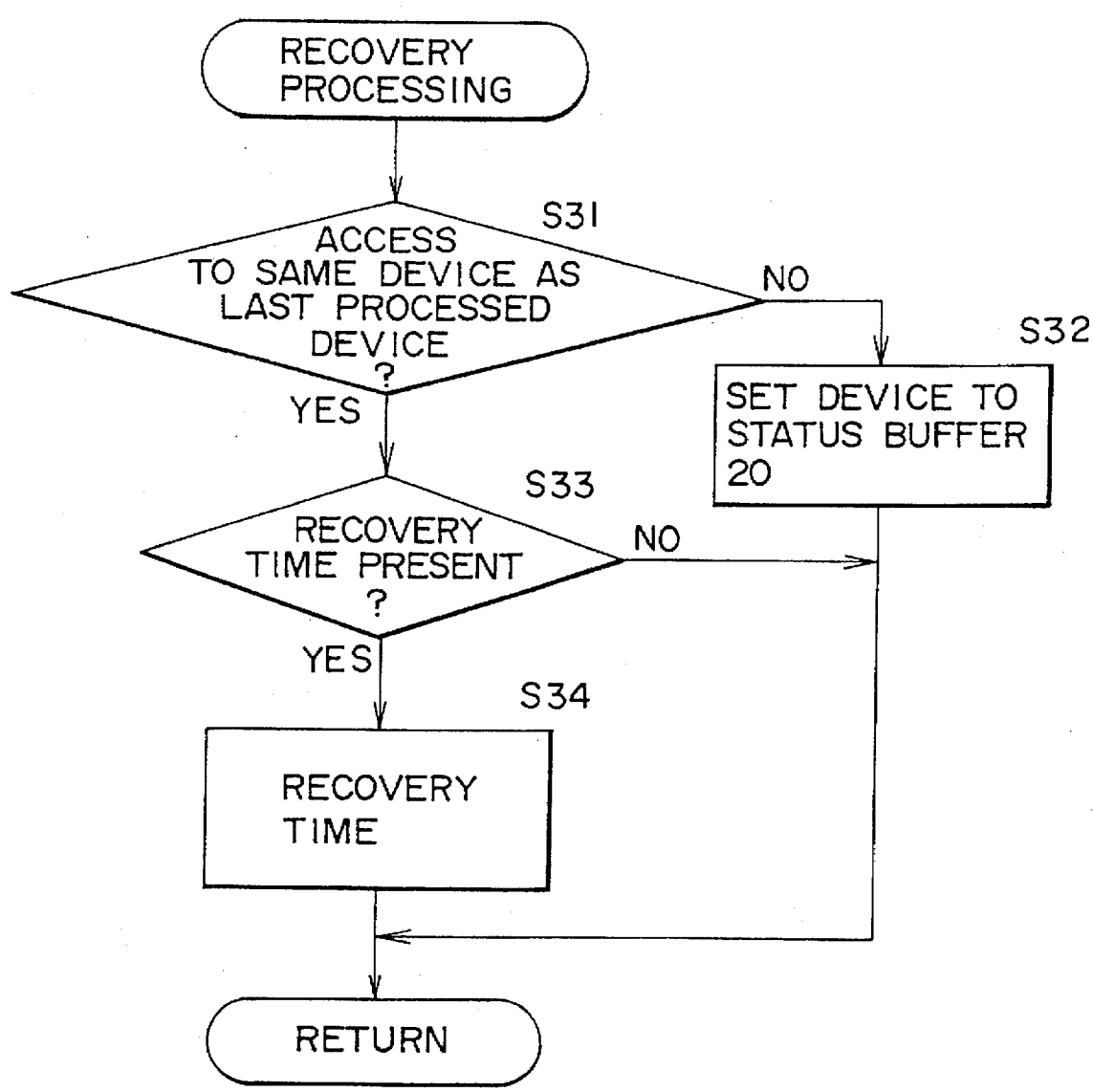

Here, the recovery processing at step S21 proceeds in such a manner as illustrated in a flow chart of FIG. 11.

In particular, referring to FIG. 11, the address buffer 21 is first referred to at step S31 to determine whether or not this particular peripheral equipment was the last peripheral equipment accessed by the CPU 1.

If it is determined at step S31 that this particular peripheral equipment being accessed now was not the last peripheral equipment accessed by the CPU 1, the control sequence advances to step S32, at which the peripheral equipment being accessed now is stored into the status buffer 20, thereby completing the processing.

On the other hand, if it is determined at step S31 that the peripheral equipment being accessed now was the last peripheral equipment accessed by the CPU 1, then the control sequence advances to step S33, to determine whether or not the peripheral equipment being accessed now has a recovery time.

If it is determined at step S33 that the peripheral equipment does not have a recovery time, the processing is completed immediately.

On the other hand if it is determined at step S33 that the peripheral equipment has a recovery time, the control sequence advances to step S34, at which a waiting time equal to the recovery time is placed, thereby completing the processing.

After the recovery processing (steps S31 to S34) is completed in such a manner as described above, that is, if the processing at step S21 of FIG. 10 is completed, then the control sequence advances to step S22, at which a read signal (SRead) is outputted by way of the sub bus 10 to the peripheral equipment from which the CPU 1 tries to read data, whereafter the control sequence advances to step S23.

At step 23, a waiting time equal to the read delay time of the peripheral equipment from which the CPU 1 tries to read data, which is described in the timing table of the timing table storage section 13, is placed, whereafter the control sequence advances to step S24, at which data are read out from the peripheral equipment. The data thus read out are latched from the lower bit side thereof into the data buffer 11, and outputting of the read signal (SRead) is stopped.

The control sequence then advances to step S25, at which it is determined whether or not the peripheral equipment from which the data have been read out has a floating time. If it is determined at step S25 that the peripheral equipment from which the data have been read out has a floating time, then the control sequence advances to step S26, at which a waiting time for the floating time is placed, whereafter the control sequence advances to step S27.

On the other hand, if it is determined at step S25 that the peripheral equipment from which the data have been read out does not have a floating time, the control sequence advances, skipping the step S26, to step S27, at which the variable N is decremented by one.

The control sequence then advances to step S28, at which it is determined whether or not the variable N is equal to 0. If it is determined at step S28 that the variable N is not equal to 0, the control sequence advances to step S29, at which outputting processing of a next address for further reading out data from the peripheral equipment is executed.

Figure 12:
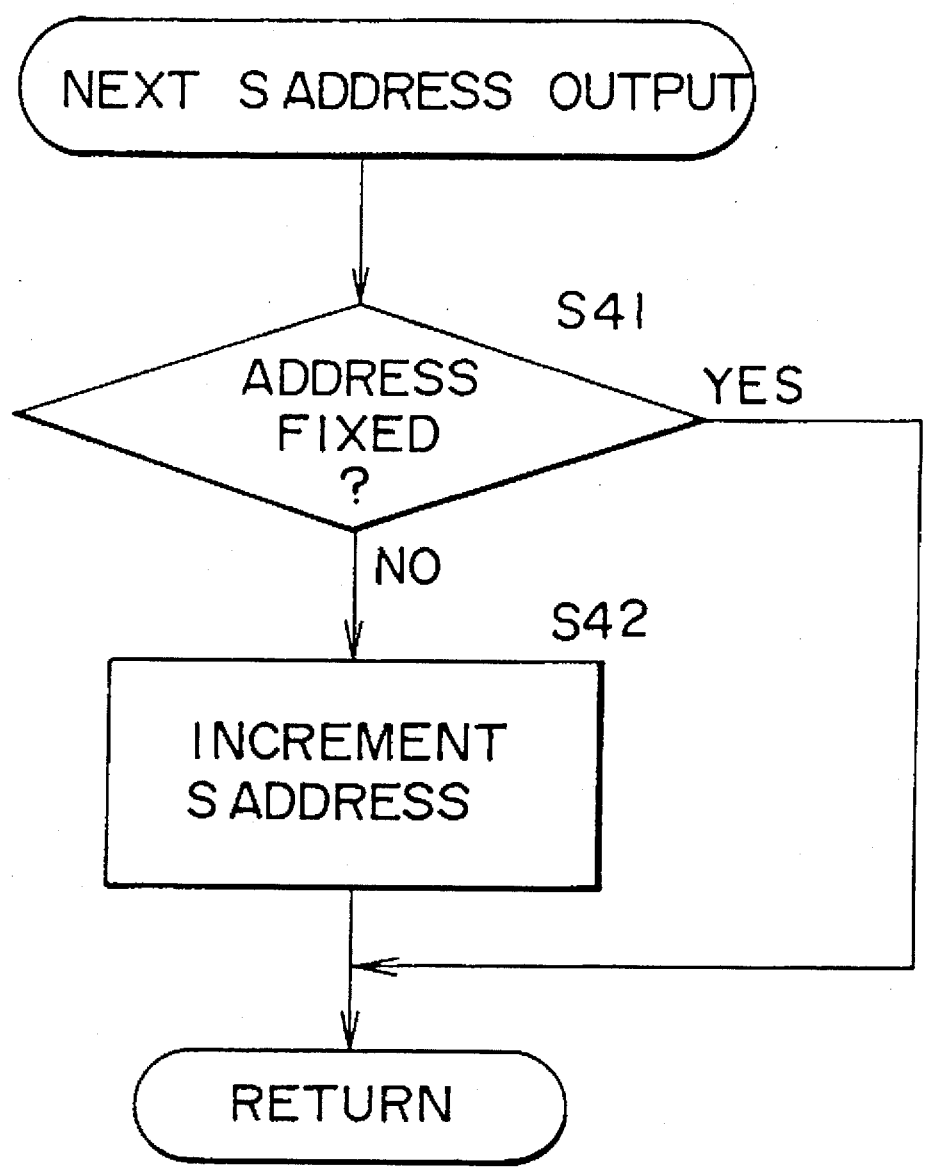

In particular, at step S29, the bus width table (FIG. 4) read out from the bus width table storage section 14 at step S7 in FIG. 9 is referred to, first at step S41 illustrated in FIG. 12, to determine whether or not the addressing type of the peripheral equipment from which the data have been read out is the fixed type.

If it is determined at step S41 that the addressing type of the peripheral equipment from which the data have been read out is the fixed type, that is, when the address stored in the address buffer 21 need not be incremented or decremented in order to further read out data from the peripheral equipment, the processing is completed skipping the step S42.

On the other hand, if it is determined at step S41 that the addressing type of the peripheral equipment from which the data have been read out is not the fixed type but the variable type, the control sequence advances to step S42, at which the address stored in the address buffer 21 is incremented by one, thereby completing the processing.

After the outputting processing for a next address is completed in such a manner as described above, that is, after processing at step S29 of FIG. 10 has been completed, the control sequence returns to step S21 until it is determined at step S28 that the variable N is equal to 0, the processing at step S21 to S29 are repeated.

Namely, at steps S21 to 29, data of the prescribed bus width are read out successively from the peripheral equipment and successively latched from the lower bit side thereof by the data buffer 11 to pack the data. The processing just described is repeated by the number of times given by (accessing type of the CPU 1)/(bus width of the peripheral equipment).

On the other hand, when it is determined at step S28 that the variable N is equal to 0, that is, when the data length of the data successively latched from the lower bit side thereof by the data buffer 11 becomes equal to the accessing type of the CPU 1 as a result of the processing at steps S21 to S29 described above, the control sequence advances to step S30, at which the data latched in the data buffer 11 are supplied to the CPU 1 by way of the main bus 9, thereby completing the processing.

After the reading processing of data from the peripheral equipment is completed in such a manner as described above, that is, after the processing at step S13 of FIG. 9 is completed, the control Sequence advances to step S14.

On the other hand, if it is determined at step S11 of FIG. 9 that the signal outputted from the CPU 1 at step S1 is a write signal, the control sequence advances to step S12, at which writing processing of data into the peripheral equipment is executed.

In particular, at step S12, the data outputted from the CPU 1 by way of the main bus 9 are first latched by the data buffer 11. Then at step S51 illustrated in FIG. 13, a signal DataOK is outputted to the CPU 1, whereafter the control sequence advances to step S52.

Consequently, the CPU 1 recognizes that writing of data into the peripheral equipment has been completed (although such writing has not actually been completed as yet) as described hereinabove.

Then at step S52, recovery processing similar to that at step S21 of FIG. 10 (steps S31 to S34 of FIG. 11) described above is executed, whereafter the control sequence advances to step S53, at which the data from the CPU 1 latched in the data buffer 11 are read out from the lower bit side thereof by way of the multiplexers 12a to 12d in accordance with the bus width (8 bits or 16 bits in the present embodiment) of the peripheral equipment, into which the data should be written. The data thus read out are outputted as signal SData to the sub bus 10 while a write signal (SWrite) is outputted to the sub bus 10.

The control sequence then advances to step S54, at which the write delay time of the peripheral equipment, into which it is tried to write data, which is described in the timing table read out from the timing table storage section 13 at step S6 of FIG. 9, is referred to to place a waiting time corresponding to the write delay time.

Consequently, the data read out from the data buffer 11 are written into the peripheral equipment in accordance with the bus width of the peripheral equipment.

Thereafter, outputting of the write signal (SWrite) is stopped at step S55, and then it is determined at step S56 whether or not the peripheral equipment into which the data have been written has a hold time. If it is determined at step S56 that the peripheral equipment into which the data have been written has a hold time, the control sequence advances to step S57, at which a waiting time for the hold time is placed, whereafter the control sequence advances to step S58.

On the other hand, if it is determined at step S56 that the peripheral equipment into which the data have been written does not have a hold time, the control sequence advances, skipping the step S57, to step S58, at which the variable N is decremented by one.

The control sequence then advances to step S59, at which it is determined whether or not the variable N is equal to 0. If it is determined at step S59 that the variable N is not equal to 0, the control sequence advances to step S60, at which outputting processing of a next address and next data for further writing data into the peripheral equipment is executed.

Figure 14:
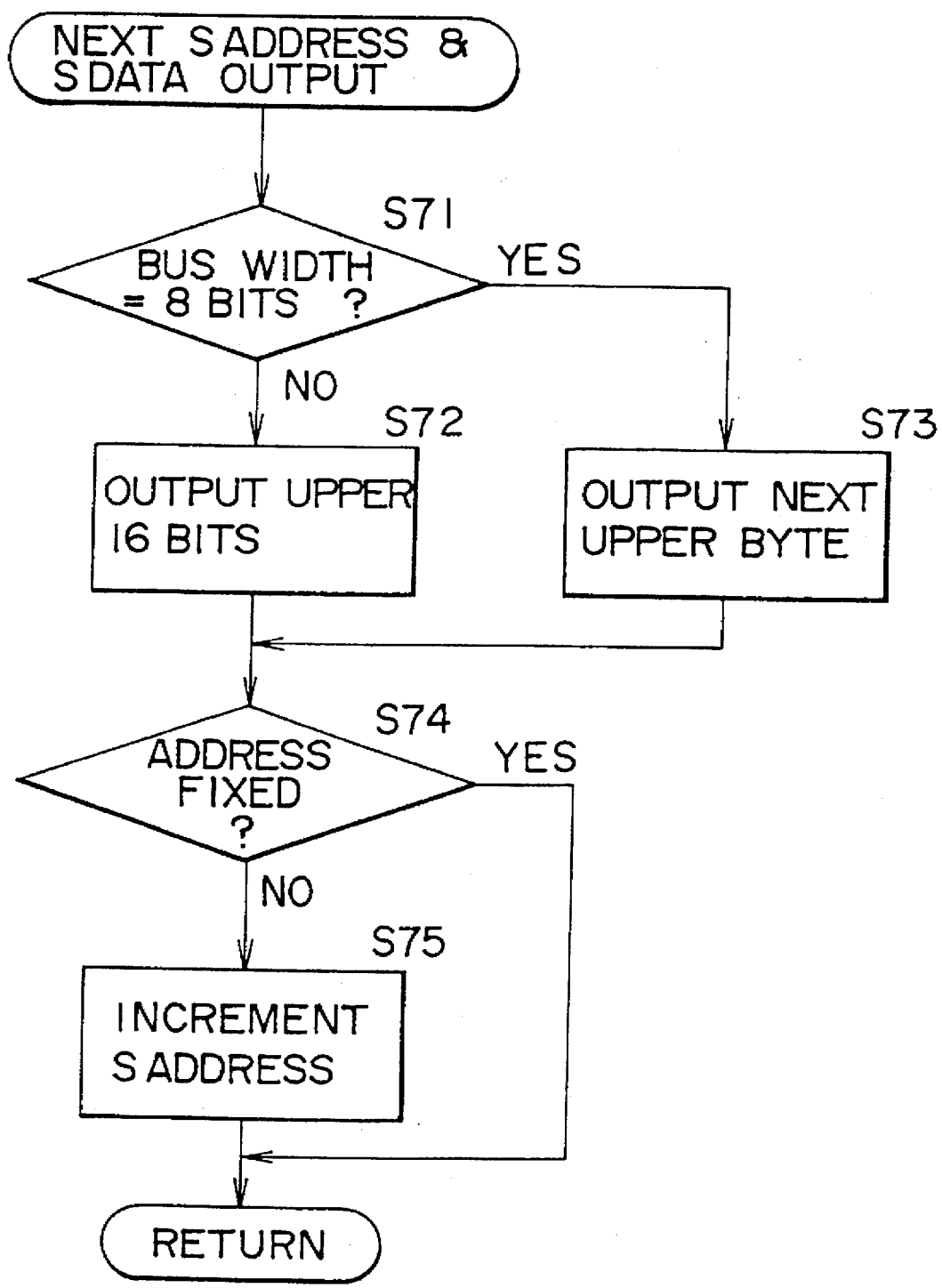

In particular, at step S60, the bus width table (FIG. 4) read out from the bus width table storage section 14 at step S7 of FIG. 9 is first referred to at step S71 illustrated in FIG. 14 to determine whether or not the bus width of the peripheral equipment into which the data have been written is 8 bits.

If it is determined at step S71 that the bus width of the peripheral equipment into which the data have been written is not 8 bits, that is, when the bus width is 16 bits (in the present embodiment, the bus width of the peripheral equipments connected to the sub bus 10 is either 8 bits or 16 bits), the control sequence advances to step S72, at which the upper 16 bits of the 32-bit data latched in the data buffer 11 are outputted to the multiplexers 12a and 12b, whereafter the control sequence advances to step S74.

On the other hand, if it is determined at step S71 that the bus width of the peripheral equipment into which the data have been written is 8 bits, the control sequence advances to step S73, at which upper 8 bits next to the 8 bits outputted last from among the 32-bit data latched in the data buffer 11 are outputted to the multiplexer 12c (or 12b or 12a), whereafter the control sequence advances to step S74.

At step S74, the bus width table (FIG. 4) is referred to again to determine whether or not the addressing type of the peripheral equipment into which the data have been written is the fixed type.

If it is determined at step S74 that the addressing type of the peripheral equipment into which the data have been written is the fixed type, that is, when the address stored in the address buffer 21 need not be incremented or decremented in order to further write data into the peripheral equipment, the processing is completed skipping the step S75.

On the other hand, if it is determined at step S74 that the addressing type of the peripheral equipment into which the data have been written is not the fixed type but the variable type, the control sequence advances to step S75, at which the address stored in the address buffer 21 is incremented by one, thereby completing the processing.

Figure 13:
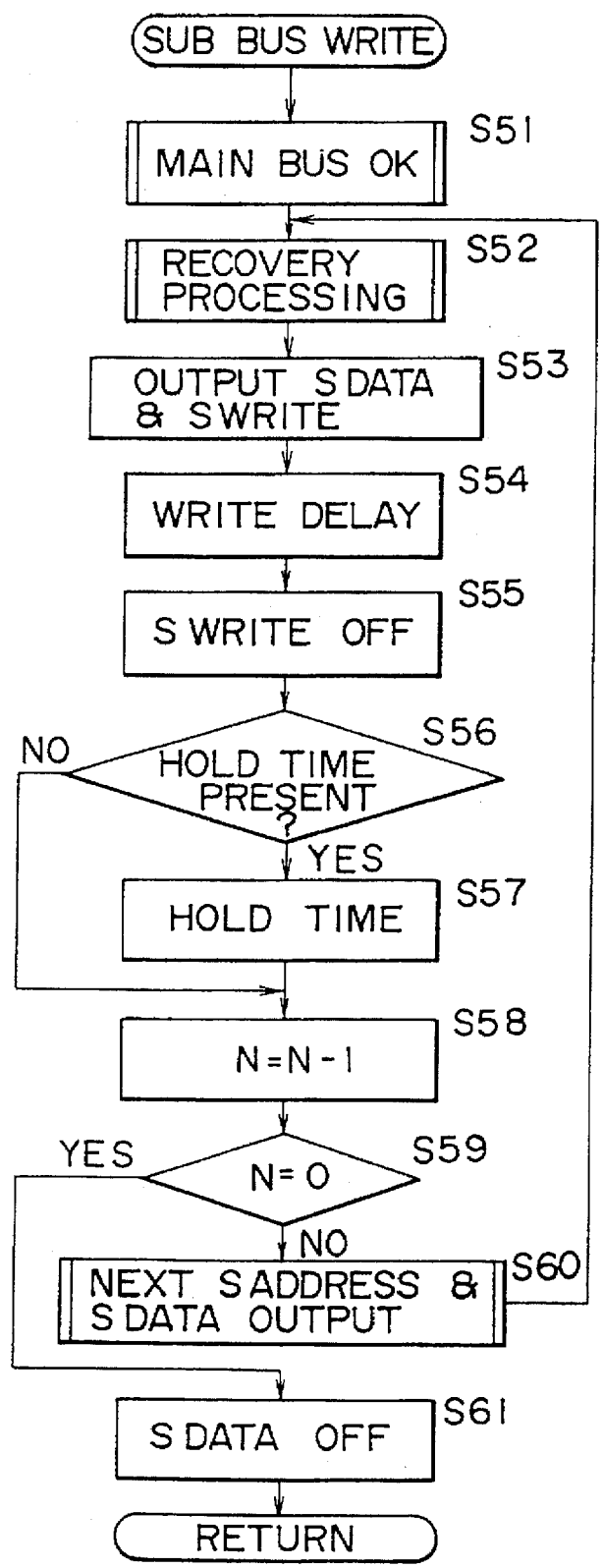

After the outputting processing of a next address and next data is completed in such a manner as described above, that is, after the processing at step S60 of FIG. 13 is completed, the control sequence returns to step S51 in order to repeat the processing at steps S51 to S60 until after it is determined at step S59 that the variable N is equal to 0.

In particular, data are successively read out from the lower bit side thereof from the data buffer 11, in which the data from the CPU 1 are stored, in accordance with the bus width of the peripheral equipment to unpack and write the data into the peripheral equipment. The processing just described is repeated by the number of times given by (accessing type of the CPU 1)/(bus width of the peripheral equipment).

On the other hand, if it is determined at step S59 that the variable N is equal to 0, that is, when the data stored in the data buffer 11 have been successively read out from the lower bit side thereof and all written into the peripheral equipment as a result of the processing at steps S51 to S60, the control sequence advances to step S61, at which outputting of the data (SData) to the peripheral equipment is stopped, thereby completing the processing.

After the writing processing of data into the peripheral equipment is completed in such a manner as described above, that is, after the processing at step S12 of FIG. 9 is completed, the control sequence successively advances to steps S14 and S15, at which outputting of the chip select signal and the address (SAddress), which has been outputted to the peripheral apparatus, is stopped.

Thereafter, the control sequence returns to step S1 to repeat the processing beginning with step S1.

Since the control of timings and the control of the bus width and the addressing type are performed parallelly (simultaneously) in such a manner as described above by the gateway 4, the processing speed of the entire apparatus can be enhanced and an application program which is reduced in dependency upon hardware can be provided.

Having now fully described the invention, it will be apparent to one of ordinary skill in the art that many changes and modifications can be made thereto without departing from the spirit and scope of the invention as set forth herein.

We claim:

1. Bus control apparatus for interconnecting a plurality of bus lines to which a central processing unit and a plurality of different peripheral equipments are connected, comprising:

a main bus to which at least a central processing unit is connected;

a sub bus to which said plurality of different peripheral equipments are connected;

storage means for storing a bus width and an addressing type information of said plurality of different peripheral equipments, said addressing type information indicating whether a respective peripheral equipment utilizes fixed or variable addressing; and a single controller for controlling reading of data from and writing of data to said respective peripheral equipment by said central processing unit in accordance with the respective bus width and the respective addressing type of said respective peripheral equipment stored in said storage means.

2. A bus control apparatus according to claim 1, wherein the bus width and the addressing type information of said plurality of different peripheral equipments stored in said storage means are rewritten when operating specifications of said plurality of different equipments are changed or new peripheral equipment is added, thereby enabling exiting application software of said central processing unit to operate without any modification.

3. A bus control apparatus according to claim 2, wherein said storage means is operable to store at least a hold time or a recovery time of said plurality of different peripheral equipments and wherein said single controller is operable to control the reading of data from and writing of data to said respective peripheral equipment in accordance with the respective hold time or recovery time of said respective peripheral equipment stored in said storage means.

4. A bus control apparatus according to claim 3, wherein the bus width of said main bus is greater than the bus width of said sub bus.

5. A bus control apparatus according to claim 4, wherein the bus width of said main bus is equal to an integral number of times the bus width of said sub bus.

6. A method of interconnecting a plurality of bus lines to which a central processing unit and a plurality of different peripheral equipments are connected, comprising the steps of:

connecting at least said central processing unit to a main bus;

connecting said plurality of different peripheral equipments to a sub bus;

storing a bus width and an addressing type information of said plurality of different peripheral equipments, said addressing type information indicating whether a respective peripheral equipment utilizes a fixed or a variable addressing; and controlling reading of data from and writing of data to said respective peripheral equipment by said central processing unit in accordance with the respective bus width and the respective addressing type of said respective peripheral equipment stored in said storage means.

7. The method to claim 6, wherein the bus width and the addressing type information of said plurality of different peripheral equipments are rewritten when operating specifications of said plurality of different equipments are changed or new peripheral equipment is added, thereby enabling exiting application software of said central processing unit to operate without any modification.

8. The method according to claim 7, further comprising the steps of storing at least a hold time or a recovery time of said plurality of different peripheral equipments and controlling reading of data from and writing of data to said respective peripheral equipment in accordance with the respective hold time or recovery time of said respective peripheral equipment.

9. The method according claim 8, wherein said main bus has a bus width greater than the bus width of said sub bus.

10. The method according to claim 9, wherein the bus width of said main bus is equal to an integral number times the bus width of said sub bus.

* * * * *

UNITED STATES PATENT AND TRADEMARK OFFICE
CERTIFICATE OF CORRECTION

PATENT NO. : 5,682,555

DATED : October 28, 1997

INVENTOR(S) : Yamamoto et al

It is certified that error appears in the above-identified patent and that said Letters Patent is hereby corrected as shown below:

On the title page, please insert the Assignee and Attorney, Agent or Firm.

Item [73], -- Sony Corporation
        Tokyo, Japan --.

Attorneys: -- William S. Frommer
        Alvin Sinderbrand --.

Signed and Sealed this

Third Day of March, 1998

*Attest:*

BRUCE LEHMAN

*Attesting Officer*     *Commissioner of Patents and Trademarks*